United States Patent [19]

Repp et al.

[11] 4,289,328
[45] Sep. 15, 1981

[54] SEAT BELT SYSTEM

[75] Inventors: John R. Repp, Dearborn; Donald H. Smith, Trenton, both of Mich.

[73] Assignee: Ford Motor Company, Dearborn, Mich.

[21] Appl. No.: 966,236

[22] Filed: Dec. 4, 1978

[51] Int. Cl.³ .............................................. B60R 21/02
[52] U.S. Cl. .................................... 280/803; 280/808
[58] Field of Search ............... 280/801, 802, 803, 807, 280/808; 180/82 C; 297/469, 474, 475, 481, 483

[56] References Cited

U.S. PATENT DOCUMENTS

| | | | |
|---|---|---|---|
| 3,351,382 | 11/1967 | Davies | 280/807 |
| 3,754,775 | 8/1973 | Williams | 297/483 |
| 3,931,988 | 1/1976 | Oehm | 280/808 |
| 3,946,965 | 3/1976 | Singh | 242/107.4 R |
| 3,973,786 | 10/1976 | Rogers | 280/807 |
| 4,040,645 | 8/1977 | Giffen | 280/803 |
| 4,118,053 | 10/1978 | Neveux | 180/82 C |

Primary Examiner—David M. Mitchell
Assistant Examiner—Randall A. Schrecengost
Attorney, Agent, or Firm—John J. Roethel; Clifford L. Sadler

[57] ABSTRACT

A vehicle seat belt system operational as a passive two-point or as a part passive and part active three-point seat occupant restraint. A continuous belt 15 coupled at one end to a retractor mechanism 16 mounted within a vehicle door passes through a guide ring 19 on the door frame and extends diagonally downwardly across the seat 13 to a second guide ring 23 anchored to the floor. The terminal end of the belt projects through the guide ring 23 and carries a buckle engaging element 27 that engages the guide ring 23 to prevent retraction of the belt 15, whereby the latter automatically operates as a two-point restraint system.

The seat occupant has the option of extending the belt 15 as a lap belt to a buckle device 32 on the outboard side of the seat. This changes the belt system to a partially passive and partially active three-point restraint system.

2 Claims, 2 Drawing Figures

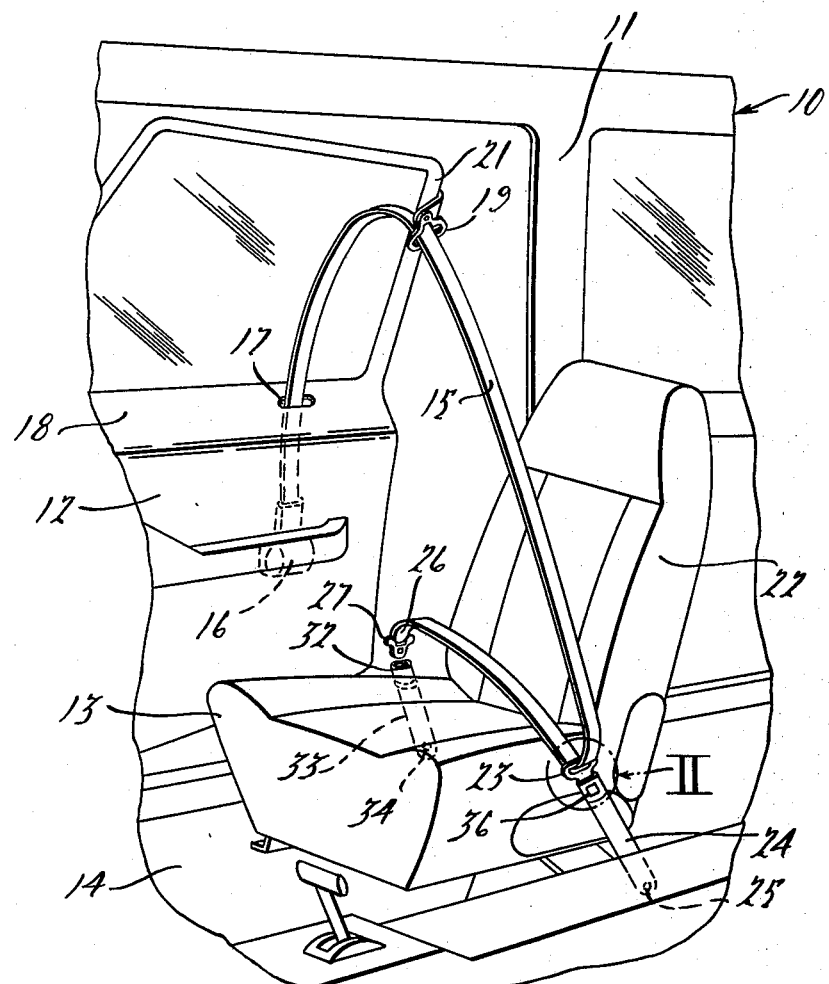
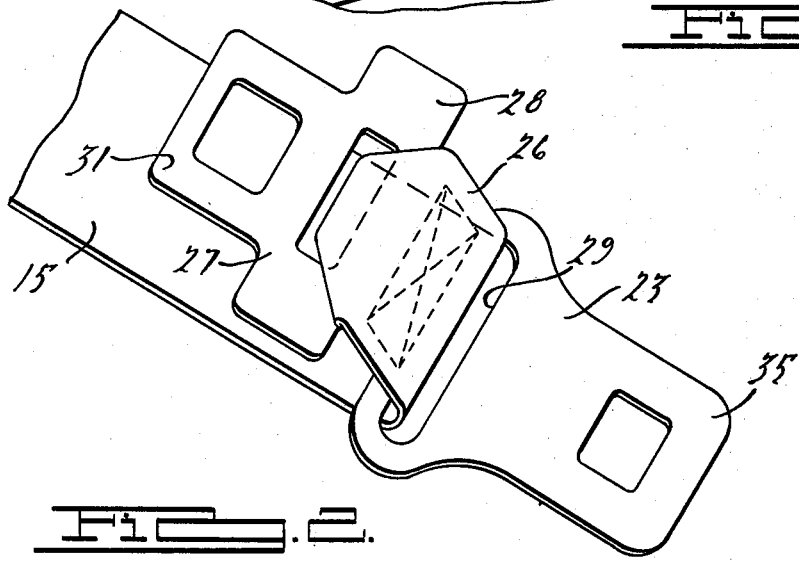

SEAT BELT SYSTEM

BACKGROUND OF THE INVENTION

By government edict, motor vehicle manufacturers are being required to provide passive passenger restraint systems, either seat belts or air bags, capable of holding vehicle occupants safely in their seats under adverse conditions, such as during a collision of the vehicle with a stationary object or another vehicle. As applied to seat belt systems, a passive system is one in which a shoulder harness, a lap belt, or a combination of both, automatically wrap around a seat occupant, for example, on the closing of the vehicle door adjacent the occupied seat.

In its simplest acceptable form, as utilized by a leading manufacturer of small vehicles, the passive seat belt system comprises a two-point system in which a shoulder harness is attached at one end to the vehicle door adjacent one side of the seat, and at its other end to the vehicle floor at the other side of the seat. When the vehicle door is opened, the harness swings away from the seat, and when the vehicle door is closed, the harness diagonally embraces the seat and the body of any passenger seated therein. Reference may be made to U.S. Pat. No. 3,931,988 issued Jan. 13, 1976 to Klaus Oehm et al for a "Vehicle Safety Device" for such a passive restraint system. As noted in this patent, the opening and closing movement of the door requires protraction and retraction of the shoulder harness. Accordingly, the latter is coupled to a take-up reel capable of unwinding as the door opens and winding as the door closes. A locking mechanism prevents the unwinding of the harness when an impact or sudden deceleration load is applied to the harness. See U.S. Pat. No. 3,946,965 issued Mar. 30, 1976 to H. Singh for a "Vehicle Sensitive Inertia Retractor" that exemplifies such a reel locking mechanism.

Even though a two-point system, as disclosed in U.S. Pat. No. 3,931,988, is considered acceptable in a passive restraint system, there are some individuals who do not feel they are fully protected without a lap belt as found in a conventional three-point harness lap belt system. Attempts to design a passive three-point system have as yet not been successful. The systems that are exemplified in the prior art are complicated and cumbersome and require a various assortment of pulleys, cables, links and springs in the mechanisms that are responsive to movement of the vehicle door to place the shoulder harness and lap belt segments in passenger restraining position.

SUMMARY OF THE INVENTION

The present invention relates to a vehicle seat belt system operational as a passive two-point or as a part passive and part active three-point seat occupant restraint. The system comprises a belt retractor mechanism mounted in a vehicle body outer wall structure, such as a vehicle door adjacent one side of a vehicle seat. A continuous seat belt extends from the retractor mechanism through a first guide ring mounted on the outer wall structure above the retractor mechanism. From the first guide ring, the seat belt extends diagonally downwardly across the upper part of a seat occupant's body to a second guide ring anchored to a vehicle floor mounted attachment means on the other side of the seat. The terminal end of the seat belt projects through the second guide ring and carries on its end a seat buckle coupling means. The seat buckle coupling means coacts with the second guide ring to prevent retraction of the seat belt from its diagonally extending occupant restraint position. When the vehicle door is open, the retractor mechanism permits additional seat belt to be paid out to compensate for the movement of the door away from the seat. This much of the passenger restraint system embodying the present invention functions as a conventional passive two-point passenger restraint system.

Mounted on the vehicle on the door side of the vehicle seat is a buckle means to which the buckle coupling means may be coupled upon manual extension of the seat belt. Such manual extension of the seat belt is permitted by the fact that the retractor mechanism will permit the belt to be lengthened as required. When the buckle coupling means is buckled to the buckle means, a portion of the belt between the buckle means and the second guide ring becomes operative as an occupant lap belt thereby providing in addition to the two-point passive restraint system an active third point of restraint. The seat belt system thus embodies a part passive segment, that is, the shoulder harness segment, and a part active segment, that is, the seat belt segment.

DESCRIPTION OF THE DRAWING

Further features and advantages of the present invention will be made more apparent as this description proceeds, reference being had to the accompanying drawing wherein:

FIG. 1 is a perspective view of a portion of a vehicle body in which the seat belt system embodying the present invention is installed; and FIG. 2 is an enlarged view taken within the circle 2 of FIG. 1.

DETAILED DESCRIPTION OF THE INVENTION

FIG. 1 of the drawing illustrates the seat belt system embodying the present invention installed in a vehicle body 10. The vehicle body 10 has an outer wall or body panel structure 11 having a door opening in which a vehicle door 12 is swingably mounted in a conventional manner. A vehicle seat 13 is mounted on the vehicle body floor 14. The seat belt system comprises a continuous belt or strap 15 having one end operatively connected to a retractor mechanism 16 mounted within the inner and outer panels of the vehicle door 12.

The belt 15 extends upwardly through an opening 17 in the beltline garnish moulding 18 on the door to a guide ring 19 swivelly fastened to an upper frame member 21 framing the window opening in the door. From the guide ring 19, the belt extends diagonally downwardly across the front of the seatback 22 of the seat 13 to a second guide ring 23. The second guide ring is anchored to the vehicle floor through an attachment strap 24 secured at its lower end to a floor anchor at 25.

The belt 15 loops through the guide ring 23 and at its terminal end 26 is attached to a seat buckle coupling means or tongue member 27 (see FIG. 2). The tongue member 27 is T-shaped with the cross-bar 28 of the T substantially longer than the length of the slot 29 in the guide ring 23. In effect, the belt 15 can never be retracted from its protracted position in which it automatically extends across the body of a person sitting in the seat 13 except under a special condition to be described. When the door 12 is swung to an open position, the belt 15 swings outwardly and forwardly of the seat permitting a person to exit the vehicle or to enter the vehicle and to sit in the seat. This arrangement enables the seat belt system to function as a known two-point passive restraint system.

In the event, however, that the seat occupant would feel more secure if a lap belt segment were available, it is only necessary to protract the belt 15 by manually pulling the terminal end 26 across the seat toward the outboard side of the vehicle body. The tongue portion 31 of the tongue member 27 may then be engaged with a conventional buckle device 32 carried on a strap 33 anchored to the vehicle floor at 34 on the outboard side of the seat 13. By buckling the terminal end 26 of the belt 15 to the outboard buckle device 32, the seat occupant now has converted the two-point passive restraint system into a partially passive and a partially active three-point restraint system.

As in a conventional restraint system, the active lap belt segment of the belt 15 may be disconnected at any time simply by releasing the tongue device 27 from the outboard buckle device 32. Although the connection between the guide 23 and the strap 24 has been described as a permanent connection, on occasion it may be necessary to permit release or disconnection of the passive shoulder harness segment of the belt 15. This may be accomplished by integrating the guide ring 23 with a buckle coupling means or tongue device 35 and attaching a buckle device 36 to the upper end of the anchor strap 24. In normal operation, it is the intention that the tongue device 35 would be engaged with the buckle device 36. It will be readily apparent, however, a quick disconnection may be made by actuating the buckle release mechanism of the buckle device 36.

It will be understood that the invention is not to be limited to the exact construction shown and described, but that various changes and modifications may be made without departing from the spirit and scope of the invention as defined in the appended claims.

We claim:

1. A vehicle seat belt system having an upper passive and a lower active seat occupant restraint means, comprising:
   a belt retractor mechanism mounted within a vehicle door adjacent one side of the vehicle seat,
   a continuous seat belt extending from the retractor mechanism through a first guide ring mounted above the retractor mechanism on a frame member of the door, and further, in door closed position, extending diagonally across the seat occupant's body and freely slidable through a second guide ring anchored to a vehicle floor mounted attachment means on the other side of the seat,
   the terminal end of the seat belt carrying a buckle tongue constructed and arranged to coact with the second guide ring to prevent disengagement of the terminal end of the seat belt from the second guide ring and thereby maintaining the seat belt in its diagonally extending occupant restraint position under all operating conditions,
   the seat belt diagonally extending portion automatically fitting itself across the upper body portion of the seat occupant upon the door being closed thereby providing an upper passive restraint means,
   and buckle means attached to the vehicle on the one side of the seat to which the buckle tongue may be manually coupled upon the seat occupant further extending the seat belt across his lap thereby providing in addition to the upper passive restraint means a lower active restraint means.

2. A vehicle seat belt system according to claim 1 in which:
   the second guide ring is integrated with a buckle tongue,
   and the floor mounted attachment means includes a buckle means receiving the last mentioned buckle tongue,
   release of the attachment buckle means permitting emergency release of the seat belt from its seat occupant restraint positions.

* * * * *